US011787751B2

(12) United States Patent
Baba et al.

(10) Patent No.: US 11,787,751 B2
(45) Date of Patent: Oct. 17, 2023

(54) WATER-ABSORBENT RESIN AND AGRICULTURAL WATER-RETAINING MATERIAL

(71) Applicant: KURARAY CO., LTD., Kurashiki (JP)

(72) Inventors: Masahiro Baba, Kurashiki (JP); Toshinori Kato, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 628 days.

(21) Appl. No.: 16/957,635

(22) PCT Filed: Dec. 28, 2018

(86) PCT No.: PCT/JP2018/048557
§ 371 (c)(1),
(2) Date: Jun. 24, 2020

(87) PCT Pub. No.: WO2019/132030
PCT Pub. Date: Jul. 4, 2019

(65) Prior Publication Data
US 2020/0347164 A1 Nov. 5, 2020

(30) Foreign Application Priority Data
Dec. 28, 2017 (JP) ................................. 2017-254468

(51) Int. Cl.
C05G 3/80 (2020.01)
C05G 3/70 (2020.01)
A01G 27/00 (2006.01)
C08F 8/28 (2006.01)
C08F 216/06 (2006.01)
C08F 216/38 (2006.01)

(52) U.S. Cl.
CPC ............... *C05G 3/80* (2020.02); *A01G 27/00* (2013.01); *C05G 3/70* (2020.02); *C08F 8/28* (2013.01); *C08F 216/06* (2013.01); *C08F 216/38* (2013.01)

(58) Field of Classification Search
CPC ............................ C08F 216/38; C08F 216/06
See application file for complete search history.

(56) References Cited

U.S. PATENT DOCUMENTS

| 4,306,031 | A | 12/1981 | Itagaki et al. |
| 4,350,773 | A | 9/1982 | Itagaki et al. |
| 5,166,263 | A | 11/1992 | Ohgi et al. |
| 10,550,038 | B2 | 2/2020 | Saka et al. |
| 2013/0065765 | A1* | 3/2013 | Selifonov ................. C08F 8/14 525/61 |

FOREIGN PATENT DOCUMENTS

| CN | 107513116 A | 12/2017 |
| JP | 34-5688 B1 | 6/1959 |
| JP | 56-28648 A | 3/1981 |
| JP | 56-53751 A | 5/1981 |
| JP | 4-346112 A | 12/1992 |
| JP | 5-1107 A | 1/1993 |
| JP | 6-136221 A | 5/1994 |
| JP | 10-231368 A | 9/1998 |
| JP | 2005-194666 A | 7/2005 |
| JP | 2006-63459 A | 3/2006 |
| JP | 2013-540164 A | 10/2013 |
| JP | 2013-544929 A | 12/2013 |
| JP | 2015-196753 A | 11/2015 |
| JP | 2018-145328 A | 9/2018 |
| JP | 2018-145329 A | 9/2018 |
| KR | 10-2005-0073428 A | 7/2005 |
| WO | WO 2017/099082 A1 | 6/2017 |

OTHER PUBLICATIONS

International Search Report dated Apr. 2, 2019 in PCT/JP2018/048557 filed Dec. 28, 2018, citing documents AA-AC, AH-AR, and AY therein, 2 Pages.

Japanese Office Action dated May 26, 2020 in Japanese Patent Application No. 2019-562523, citing documents AU and AV therein, 4 Pages.

Masamitsu Nagano, et al., "Effect of Stereoregularity of Poly (Vinyl Alcohol) on the Crystallization by Heat-Treatment," Kobunshi Kagaku, vol. 24, No. 271, 1967, pp. 746-750.

\* cited by examiner

*Primary Examiner* — Jeffrey C Mullis
(74) *Attorney, Agent, or Firm* — Oblon, McClelland, Maier & Neustadt, L.L.P.

(57) ABSTRACT

A water-absorbent resin containing a vinyl alcohol-based polymer and having a crystal melting enthalpy of more than 0 J/g in a dry state.

9 Claims, No Drawings

WATER-ABSORBENT RESIN AND AGRICULTURAL WATER-RETAINING MATERIAL

TECHNICAL FIELD

The present invention relates to a water-absorbent resin and to an agricultural water-retaining material containing the water-absorbent resin.

BACKGROUND ART

With current chronic exhaustion of water resources, effective and suitable use of agricultural water and attempts to maintain or enlarge crop yields even in use of a smaller amount of irrigation water than before are being investigated using so-called agricultural water-retaining materials (for example, see PTLs 1 to 3). These agricultural water-retaining materials have a superabsorbent polymer (SAP) as a main constitutive component, and, for example, as compared with peat moss that is used for improving water retentivity of whole soil, these materials can express the effect even when used in an extremely small amount, and therefore have an advantage that the load to farmers using them is small.

PTLs 1 and 2 disclose use of a superabsorbent polymer mainly composed of a polyacrylate gel as an agricultural water-retaining material. However, a polyacrylate gel is not biodegradable and therefore has a problem in that it could hardly deaden in environments.

As a means for solving the problem, PTL 3 discloses particles containing a neutralized polyvinyl glyoxylate and having complicated surface profile characteristics, saying that the particles are applicable to a sanitary material, an agricultural water-retaining material, etc.

CITATION LIST

Patent Literature

PTL 1: JP 4346112
PTL 2: JP 2013-544929 T
PTL 3: JP 2013-540164 T

SUMMARY OF INVENTION

Technical Problem

However, though the particles disclosed in PTL 3 can have an increased water-absorbing speed owing to the complicated surface profile characteristics thereof, the water-absorbing speed thereof is still insufficient since the water-diffusing speed inside the gels does not change. An object of the present invention is to solve the above-mentioned problem, and to provide a water-absorbent resin excellent in speed of water absorption.

Solution to Problem

As a result of assiduous studies, the present inventors have found that a water-absorbent resin containing a specific resin and having a crystal melting enthalpy of more than 0 J/g can solve the above-mentioned problem, and have reached to present invention. Specifically, the object of the present invention is attained by providing the following [1] to [10].

[1] A water-absorbent resin containing a vinyl alcohol-based polymer and having a crystal melting enthalpy of more than 0 J/g in a dry state.
[2] The water-absorbent resin according to [1], wherein the vinyl alcohol-based polymer has a carboxy group.
[3] The water-absorbent resin according to [1] or [2], wherein the vinyl alcohol-based polymer is such that at least a part of the vinyl alcohol unit therein is acetalized with one or more selected from an aldehyde having a carboxy group and a derivative of the aldehyde.
[4] The water-absorbent resin according to [3], wherein the aldehyde is a glyoxylic acid.
[5] The water-absorbent resin according to any of [2] to [4], wherein the carboxy group amount in the vinyl alcohol-based polymer is 0.05 mol % or more and 40 mol % or less relative to all the structural units in the vinyl alcohol-based resin.
[6] The water-absorbent resin according to any of [1] to [5], wherein the average residual hydroxy group amount in the vinyl alcohol-based polymer is more than 20 mol %.
[7] The water-absorbent resin according to any of [1] to [6], wherein the crystal melting enthalpy is 10 J/g or more and 50 J/g or less.
[8] The water-absorbent resin according to any of [1] to [7], wherein the water-absorbent resin contains a crosslinked structure.
[9] The water-absorbent resin according to any of [1] to [8] for agricultural use.
[10] An agricultural water-retaining material containing an absorbent resin of any of [1] to [8].

Advantageous Effects of Invention

The water-absorbent resin of the present invention is excellent in speed of water absorption. Accordingly, in the case where the water-absorbent resin of the present invention is used, for example, as an agricultural water-retaining material, outflow of given water to the ground can be prevented and water use efficiency can be thereby increased. The reason is as follows. Specifically, of water given to soil from the surface of the ground, more than the amount thereof capable of being retained by the soil flows out into the underground, but in the case where a water-absorbent resin used as an agricultural water-retaining material is excellent in speed of water absorption, the water-absorbent resin can retain water before water flows out into the underground.

DESCRIPTION OF EMBODIMENTS

Embodiments of the present invention are described below, but the present invention is not limited to the embodiments.

The water-absorbent resin of the present invention contains a vinyl alcohol-based polymer (hereinafter this may be referred to as a vinyl alcohol-based polymer (A)). Examples of the vinyl alcohol-based polymer (A) include a polyvinyl alcohol and an ethylene-vinyl alcohol copolymer. Above all, from the viewpoint of expressing excellent water absorbability and high speed of water absorption, the vinyl alcohol-based polymer (A) preferably has a carboxy group.

Examples of the carboxy group-having vinyl alcohol-based polymer (A) include (i) a saponified product of a copolymer of one or more selected from a carboxy group-having monomer and a derivative of the monomer, and a vinyl ester; and (ii) a reaction product of a vinyl alcohol-based polymer and a compound having a functional group reactive with a hydroxy group and and a carboxy group and/or a functional group capable of being derived into a carboxy group.

Regarding the above (i), the carboxy group-having monomer is not specifically limited, and examples thereof include acrylic acid, methacrylic acid and maleic acid. Derivatives of the carboxy group-having monomer include anhydrides, esters and neutralized products of the monomer, and examples thereof include methyl acrylate, methyl methacrylate, monomethyl maleate and maleic anhydride. Regarding (i), examples of the vinyl ester include vinyl acetate.

A method for producing the saponified product (i) is not specifically limited, and the product can be produced through known polymerization reaction of one or more selected from a carboxy group-having monomer and a derivative of the monomer, and a vinyl ester using a known polymerization initiator, followed by saponification according to a known method.

In the compound having a functional group reactive with a hydroxy group and and a carboxy group and/or a functional group capable of being derived into a carboxy group for use in the above (ii), the functional group reactive with a hydroxy group is not specifically limited and examples thereof include an aldehyde group, a carboxy group, an amino group and derivatives of these functional groups. Above all, from the viewpoint of easiness in production and durability of water-absorbent resin, an aldehyde group and derivatives of an aldehyde group are preferred. Specifically, the reaction product of the above (ii) is preferably one prepared by acetalization of at least a part of vinyl alcohol units with one or more selected from a carboxy group-having aldehyde and a derivative of the aldehyde (hereinafter this may be referred to as a vinyl alcohol-based polymer (A-1)). The carboxy group-having aldehyde is not specifically limited, but is preferably a carboxy group-having aldehyde having 2 to 10 carbon atoms, and examples thereof include a glyoxylic acid, a 2-formylpropanoic acid, a 3-formylpropanoic acid and a phthalaldehyclic acid. Above all, from the viewpoint of easy availability and biodegradability, a carboxy group-having aldehyde having 2 to 8 carbon atoms is more preferred, and glyoxylic acid is more preferred. The derivative of the carboxy group-having aldehyde includes anhydrides, esters and neutralized products of the aldehyde, and examples thereof include glyoxylate salts and glyoxylate esters.

The counter cation of the glyoxylate salt includes an alkali metal ion such as a sodium ion, a potassium ion and a lithium ion; and an alkaline earth metal ion such as a calcium ion and a magnesium ion. Above all, from the viewpoint of expressing a higher speed of water absorption in use as an agricultural water-retaining material, a potassium ion, a calcium ion and a magnesium ion are preferred. From the viewpoint of maintaining water absorbability in contact with a divalent ion contained in soil, a calcium ion is more preferred, and from the viewpoint of growth of plants, a potassium ion is more preferred.

Examples of the glyoxylate ester include methyl glyoxylate, ethyl glyoxylate, propyl glyoxylate, isopropyl glyoxylate, butyl glyoxylate, isobutyl glyoxylate, sec-butyl glyoxylate, tert-butyl glyoxylate, hexyl glyoxylate, octyl glyoxylate, and 2-ethylhexyl glyoxylate.

A method for producing the vinyl alcohol-based polymer (A-1) is not specifically limited so far as the resultant water-absorbent resin can have a crystal melting enthalpy of more than 0 J/g in a dry state, and the polymer can be produced by acetalizing at least a part of vinyl alcohol units in a vinyl alcohol-based polymer produced according to a known method, with one or more selected from a carboxy group-having aldehyde and a derivative of the aldehyde, in the presence or absence of a catalyst. The present inventors have found that, when an aqueous solution of a vinyl alcohol-based polymer and an aqueous solution of a glyoxylic acid are mixed and reacted, for example, like in PTL 3, the crystal melting enthalpy of the resultant product in a dry state is 0 J/g, while, on the other hand, according to a method of heterogeneous reaction of mixing and reacting a solution with a vinyl alcohol-based polymer dispersed therein and a glyoxylic acid, the crystal melting enthalpy of the product in a dry state is more than 0 J/g. Accordingly, in the case where a carboxy group-having aldehyde is a glyoxylic acid and where the product in the production process of the vinyl alcohol-based polymer (A-1) is used as a water-absorbent resin directly as it is, a method of heterogeneous reaction needs to be used in the acetalization step.

Here, the heterogeneous reaction in the present invention is acetalization of a starting material of vinyl alcohol-based polymer particles with one or more selected from a carboxy group-having aldehyde or a derivative of the aldehyde in production of the vinyl alcohol-based polymer (A-1). As to whether or not the reaction is a heterogeneous reaction, the reaction solution immediately after acetalization is visually observed, and when particles are seen in the reaction solution, the acetalization reaction is heterogeneous reaction. Namely, the vinyl alcohol-based polymer (A-1) can be produced according to a production method of acetalization of a starting material of vinyl alcohol-based polymer particles with one or more selected from a carboxy group-having aldehyde or a derivative of the aldehyde.

The dispersion medium for use in the heterogeneous reaction is not specifically limited so far as it can swell the starting material, vinyl alcohol-based polymer particles but does not dissolve them at a reaction temperature. During reaction, from the viewpoint of not dissolving the vinyl alcohol-based polymer and keeping the polymer as particles, the dispersion medium preferably contains an organic solvent. The content of the organic solvent in the dispersion medium is preferably 5% by mass or more, more preferably 20% by mass or more, even more preferably 50% by mass or more, further more preferably 70% by mass or more, especially more preferably 80% by mass or more, and may even be 100% by mass. When the content of the organic solvent is more than the lower limit, the crystal melting enthalpy can be readily more than 0 J/g. On the other hand, a case where the content of the organic solvent is 95% by mass or less (more preferably 92% by mass or less, even more preferably 90% by mass or less, especially preferably 85% by mass or less) is also a preferred embodiment of the present invention. When the content of the organic solvent is not more than upper limit as in the case, the polyvinyl alcohol particles can be suitably swollen in the solvent and the solvent can dissolve the carbonyl compound and therefore the polyvinyl alcohol particles tend to be uniformly acetalized even in the depth thereof.

Though not specifically limited, examples of the organic solvents include dialkyl ketones such as acetone and 2-butanone; nitriles such as acetonitrile; alcohols such as methanol, ethanol, 1-propanol, 2-propanol, 1-butanol, 2-butanol, amyl alcohol, isoamyl alcohol, hexanol, cyclohexanol, octanol, and tert-butanol; ethers such as 1,4-dioxane, tetrahydrofuran, 1,2-dimethoxyethane, and diglyme; diol compounds such as ethylene glycol, and triethylene glycol; carboxylic acid amides such as acetamide, N,N-dimethylformamide, N,N-dimethylacetamide, and N-methylpyrrolidone; dimethyl sulfoxide and phenol. Above all, considering easiness in removal of solvent from the modified polyvinyl alcohol resin after heterogeneous reaction, solubility of a carbonyl compound and an acid catalyst in solvent, and industrial availability of solvent, the organic solvent is preferably at least one selected from the group consisting of dialkyl ketones, nitriles, alcohols and ethers, more preferably at least one selected from the group consisting of acetone, 2-butanone, acetonitrile, methanol, ethanol, 1-propanol, 2-propanol, tert-butanol, 1,4-dioxane and tetrahydrofuran, and even more preferably at least one selected from the group consisting of acetone, 2-butanone, acetonitrile, methanol, 2-propanol, 1,4-dioxane and tetrahydrofuran. One alone or two or more of these organic solvents may be used either singly or as combined. As described below, the solvent to be used in heterogeneous reaction may contain water, but in the case where the solvent used in heterogeneous reaction does not contain water, the organic solvent is preferably at least one selected from the group consisting of dialkyl ketones, nitriles, alcohols and ethers, more preferably dialkyl ketones and/or nitriles, and even more preferably acetone and/or acetonitrile. With progress of acetalization, interaction between the modified polyvinyl alcohol and the solvent may change, and therefore for the purpose of swelling degree control, a solvent may be added during the reaction.

Examples of the solvent include inorganic acids such as hydrochloric acid, sulfuric acid and phosphoric acid; organic acids such as carboxylic acids and sulfonic acids; and solid acids such as cation-exchange resins, and heteropoly-acids. One kind alone or plural kinds of these catalysts may be used either singly or as combined. A glyoxylic acid is an acid to promote acetalization, and therefore in producing the vinyl alcohol-base polymer (A-1), the acid acts also as a catalyst. Specifically, from the viewpoint of easiness in treatment after reaction, in producing the vinyl alcohol-based polymer (A-1), a method of using a glyoxylic acid as a carboxy group-having aldehyde is preferred.

In the method of producing the vinyl alcohol-based polymer (A-1) by acetalizing a starting material of vinyl alcohol-based polymer particles with one or more selected from a carboxy group-having aldehyde and a derivative of the aldehyde, preferably the acetalization is carried out at 80° C. or lower.

The vinyl alcohol-based polymer to be used as a starting material in production of the vinyl alcohol-based polymer (A-1) may be any of industrially-produced commercial products; those produced by known polymerization of a vinyl carboxylate such as vinyl acetate optionally along with any other polymer using a known polymerization initiator followed by saponification according to a known method; those produced by cationic polymerization of a vinyl ether followed by hydrolysis; and those produced by direct polymerization of an acetaldehyde. Preferred are those produced by saponification of a polyvinyl acetate prepared by polymerization of vinyl acetate. The degree of saponification of the vinyl alcohol-based polymer to be used as a starting material in the above is preferably 30 mol % or more, more preferably 60 mol % or or, and from the viewpoint of introducing an adequate amount of a carboxy group in one embodiment of the present invention, the degree is even more preferably 80 mol % or more.

The degree of acetalization of the vinyl alcohol-based polymer (A-1) is preferably 0.01 mol % or more and 85 mol % or less. When the degree of acetalization is not less than the lower limit, water absorbability can be improved. When the degree of acetalization is not less than the upper limit, the crystal melting enthalpy value in a dry state can be readily large. From the viewpoint, the degree of acetalization is preferably 0.1 mol % or more, more preferably 1 mol % or more, even more preferably 5 mol % or more, further more preferably 10 mol % or more, especially preferably 15 mol % or more, and is preferably 80 mol % or less, more preferably 70 mol % or less, even more preferably 60 mol % or less, further more preferably 50 mol % or less, especially more preferably 45 mol % or less, and still further more preferably 40 mol % or less.

From the viewpoint of suppressing dissolution of the water-absorbent resin in use, the acetalization can be carried out using any other aldehyde in addition to a carboxy group-having aldehyde and a derivative of the aldehyde in production of the vinyl alcohol-based polymer (A-1). Examples of the other aldehyde include aliphatic aldehydes such as formaldehyde, acetaldehyde, propionaldehyde, n-butylaldehyde, i-butylaldehyde, sec-butylaldehyde, and tert-butylaldehyde; aromatic aldehydes such as benzaldehyde, anisaldehyde, cinnamic aldehyde, 4-benzyloxybenzaldehyde, 3-benzyloxybenzaldehyde, 4-amyloxybenzaldehyde, and 3-amyloxybenzaldehyde. Above all, from the viewpoint of easiness in production and water-absorbing performance of the water-absorbent resin, formaldehyde, acetaldehyde and n-butyl aldehyde are preferred. In the case where the other aldehyde is co-used, the amount thereof is not specifically limited, but is generally 0.01 to 30 mol % relative to the total of a carboxylic acid-having aldehyde and a derivative of the aldehyde, preferably 0.1 to 10 mol %, more preferably 1 to 5 mol %. When the amount of the other aldehyde is not more than the upper limit, the water-absorbing performance of the resultant water-absorbent resin tends to be excellent, and when the amount is not less than the lower limit, the effect of co-using the other aldehyde to prevent dissolution of the water-absorbent resin in use can be readily realized. The other aldehyde may be used as a derivative such as an acetalized form.

In one embodiment of the present invention where the vinyl alcohol-based polymer (A) has a carboxy group, a part or all of the carboxy group may be a carboxylate. Examples of the pair cation of the carboxylate include alkali metal ions such as a lithium ion, a sodium ion, a potassium ion, a rubidium ion, and a cesium ion; alkaline earth metal ions such as a magnesium ion, a calcium ion, a strontium ion and a barium ion; other metal ions such as an aluminum ion and a zinc ion; onium cations such as an ammonium ion, an imidazolium ion, a pyridinium ion and a phosphonium ion. Above all, in use for an agricultural water-retaining material, a potassium ion, a calcium ion and an ammonium ion are preferred, from the viewpoint of maintaining the water-absorbing performance in contact with a divalent ion contained in soil, a calcium ion is more preferred, and from the viewpoint of growth of plants, a potassium ion is more preferred. Regarding production of the vinyl alcohol-based polymer (A) where a part or all of the carboxy group is a carboxylate, examples of production method include a method of using a neutralized product of a carboxy group-having monomer in the above (i); a method of using a neutralized product of a compound having a functional group reactive with a hydroxy group, and a carboxy group in the above (ii); and a method of producing a carboxy group-having vinyl alcohol-based polymer (A) according to the above-mentioned various methods and then neutralizing the resultant polymer.

In one embodiment of the present invention where the vinyl alcohol-based polymer (A) has a carboxy group, the carboxy group amount in the vinyl alcohol-based polymer (A) is preferably 0.05 mol % or more relative to all the structural units in the vinyl alcohol-based polymer (A), more preferably 0.1 mol % or more, even more preferably 1 mol % or more, especially more preferably 3 mol % or more, most preferably 5 mol % or more, and is preferably 40 mol % or less, more preferably 30 mol % or less, even more preferably 25 mol % or less, especially more preferably 15 mol % or less, most preferably less than 15 mol %. When the carboxyl group amount is not less than the lower limit, the water-absorbing performance of the water-absorbent resin of the present invention is more excellent, and when the amount is not more than the upper limit, the resin can readily maintain the water-absorbing performance even in contact with a divalent ion contained in soil and the melting enthalpy value in a dry state thereof can be readily large. The amount of the carboxy group can be measured, for example, through NMR (nuclear magnetic resonance), FTIR (Fourier transform infrared spectroscopy) or acid-base titration. In the present invention, "structural unit" means a recurring unit constituting a polymer, and for example, a vinyl alcohol unit is counted as "one unit", and an acetalized structure of two vinyl alcohol units is counted as "two units".

The average residual hydroxy group amount in the vinyl alcohol-based polymer (A) is preferably more than 20 mol %, more preferably 50 mol % or more, even more preferably 60 mol % or more, and is preferably 98 mol % or less, more preferably 95 mol % or less, even more preferably 90 mol % or less. The average residual hydroxy group amount can be measured, for example, through FTIR (Fourier transform infrared spectroscopy) or solid NMR (nuclear magnetic resonance), and can be calculated from the consumption amount of acetic anhydride in reacting the polymer with a certain amount of acetic anhydride.

The vinyl alcohol-based polymer (A) may contain any other structural unit than a vinyl alcohol unit and a carboxy group-having structural unit. Examples of the other structural unit include structural units derived from a vinyl carboxylate such as vinyl acetate and vinyl pivalate; structural units derived from olefins such as ethylene, 1-butene and isobutylene; and structural units derived from acrylic acid and derivatives thereof, methacrylic acid and derivatives thereof, acrylamide and derivatives thereof, methacrylamide and derivatives thereof, maleic acid and derivatives thereof, and maleimide derivatives. One kind alone or plural kinds of the above-mentioned other structural units may be contained either singly or as combined. The content of the other structural unit is preferably 50% by mass or less relative to all the structural units in the vinyl alcohol-based polymer (A), more preferably 30% by mass or less, even more preferably 15% by mass or less, and may even be 0% by mass. When the content of the other structural unit is not less than the lower limit, the water-absorbent resin of the present invention can be excellent in speed of water absorption.

The viscosity-average degree of polymerization of the vinyl alcohol-based polymer (A) is not specifically limited but is, from the viewpoint of easiness in production, preferably 20,000 or less, more preferably 10,000 or less, even more preferably 5,000 or less, especially more preferably 3,000 or less, and most preferably 2,000 or less. On the other hand, from the viewpoint of the mechanical properties of the water-absorbent resin, the viscosity-average degree of polymerization is preferably 100 or more, more preferably 200 or more, even more preferably 400 or more, especially more preferably 500 or more, and most preferably 1,000 or more. The viscosity-average degree of polymerization of the vinyl alcohol-based polymer (A) can be determined, for example, through measurement according to a method of JIS K 6726.

The water-absorbent resin of the present invention preferably contains a crosslinked structure from the viewpoint of preventing dissolution thereof in use. In the case where the water-absorbent resin of the present invention contains a crosslinked structure, the resin becomes gel in absorption of water. The form of the crosslinked structure is not specifically limited, and examples thereof includes crosslinked structures with any of an ester bond, an ether bond, an acetal bond and a carbon-carbon bond.

Examples of the ester bond in the case where the vinyl alcohol-based polymer (A) has a carboxy group include an ester bond formed between the hydroxy group and the carboxy group that the vinyl alcohol-based polymer (A) has. Examples of the ether bond include an ether bond formed through dehydrating condensation between the hydroxy groups that the vinyl alcohol-based polymer (A) has. Examples of the acetal bond in the case where a carboxy group-having aldehyde is used in production of the vinyl alcohol-based polymer (A) include an acetal bond formed through acetalization between the hydroxy groups that the two vinyl alcohol-based polymers (A) have in the presence of the aldehyde. Examples of the carbon-carbon bond include a carbon-carbon bond to be formed by coupling between the carbon radicals of the vinyl alcohol-based polymer (A) that are formed in irradiation of the water-absorbent resin with an active energy ray. One kind alone or plural kinds of these crosslinked structure may be contained. Above all, a crosslinked structure with an ester bond or an acetal bond is preferred, and from the viewpoint of maintaining water retentivity in soil, a crosslinked structure with an acetal bond is more preferred.

Such a crosslinked structure can be formed, for example, simultaneously with an acetalization step of acetalizing at least a part of a vinyl alcohol unit with one or more selected from a carboxy group-having aldehyde or a derivative of the aldehyde, or can be formed in a different step, but in the present invention, preferably, a crosslinked structure is formed by further adding a crosslinking agent.

Examples of the crosslinking agent include glyoxal, malonaldehyde, succinaldehyde, glutaraldehyde, 1,9-nonandial, adipaldehyde, maleadehyde, tartaraldehyde, citraldehyde, phthalaldehyde, isophthalaldehyde, and terephthalaldehyde.

The crosslinking agent amount in the water-absorbent resin is, from the viewpoint of maintaining water retentivity in soil, preferably 0.001 mol % or more, more preferably 0.005 mol % or more, even more preferably 0.01 mol % or more, further more preferably 0.03 mol % or more, and is preferably 0.5 mol % or less, more preferably 0.4 mol % or less, even more preferably 0.3 mol % or less.

The water-absorbent resin of the present invention is characterized by having a crystal melting enthalpy of more than 0 J/g in a dry state. When the crystal melting enthalpy is more than 0 J/g, the speed of water absorption is sufficiently high. Consequently, in the case where the water-absorbent resin of the present invention is used, for example, as an agricultural water-retaining material, outflow of given water to the ground can be prevented and water use efficiency can be thereby increased. The crystal melting enthalpy is preferably 0.5 J/g or more, more preferably 1 J/g or more, even more preferably 5 J/g or more, further more preferably 10 J/g or more, and is preferably 200 J/g or less, more preferably 100 J/g or less, even more preferably 60 J/g or less, especially more preferably 50 J/g or less. When the crystal melting enthalpy is not lower than the lower limit, fusion of particles in water absorption to form coarse aggregates can be prevented. When coarse aggregates are formed, much time is taken until water can diffuse in the center of the aggregates and therefore the water absorption speed becomes low. If so, in use as an agricultural water-retaining material, outflow of given water to the ground increases. The crystal melting enthalpy can be measured, for example, in DSC (differential scanning calorimetry), SAXS (small-angle X-ray scattering), or pulse NMR (nuclear magnetic resonance), specifically according to the method described in the section of Examples.

In the present invention, "dry state" means a state of the water-absorbent resin not containing any volatile components such as water and organic solvents. For example, the water-absorbent resin can be made to be in a dry state by drying in vacuum at 40° C. until the mass of the water-absorbent resin becomes a constant mass.

The water-absorbent resin of the present invention may further contain any other additives within a range not detracting from the advantageous effects of the present invention. Examples of such other additives include polysaccharides such as starch, modified starch, sodium alginate, chitin, chitosan, cellulose and derivatives thereof; resins such as polyethylene, polypropylene, ethylene-propylene copolymer, polystyrene, acrylonitrile-styrene copolymer, acrylonitrile-butadiene-styrene copolymer, polyvinyl chloride, polycarbonate resin, polyethylene terephthalate, polybutylene terephthalate, polylactic acid, polysuccinic acid, polyamide 6, polyamide 6-6, polyamide 6-0, polyamide 11, polyamide 12, polyamide 6-12, polyhexamethylenediamine terephthalamide, polyhexamethylenediamine isophthalamide, polynonamethylenediamine terephthalamide, polyphenylene ether, polyoxymethylene, polyethylene glycol, polypropylene glycol, polytrimethylene glycol, polytetramethylene glycol, polyurethane, polyvinyl alcohol, ethylene-vinyl alcohol copolymer, polyvinyl acetate, ethylene-vinyl acetate copolymer, polyacrylic acid, polyacrylic acid ester, polyacrylate, polymethacrylic acid, polymethacrylic acid ester, polymethacrylate, ethylene-acrylic acid copolymer, ethylene-acrylic acid ester copolymer, ethylene-acrylate copolymer, ethylene-methacrylic acid copolymer, ethylene-methacrylic acid ester copolymer, and ethylene-methacrylate copolymer; rubbers and elastomers such as natural rubber, synthetic isoprene rubber, chloroprene rubber, silicone rubber, fluororubber, urethane rubber, acrylic rubber, styrene-based thermoplastic elastomer, olefin-based thermoplastic elastomer, ester-based thermoplastic elastomer, urethane-based thermoplastic elastomer, and amide-based thermoplastic elastomer; clay minerals such as kaolinite, smectite, montmorillonite, sericite, chlorite, glauconite, talc, natural zeolite, and synthetic zeolite; and sand. One kind alone or plural kinds of these may be contained either singly or as combined.

The water-absorbent resin of the present invention is favorable for agricultural use. Specifically, an agricultural water-retaining material containing the water-absorbent resin of the present invention is also one aspect of the present invention. In use for an agricultural water-retaining material, various methods are employable including a method of directly spraying the material in a farm field; a method of applying the material along with planting crop seeds; and a method of once coating seeds with the material and planting the coated seeds. Alternatively, a mixture of the water-absorbent resin of the present invention and water can be used as a medium. The crops to which the present invention is applied are not specifically limited, and examples thereof include various vegetables, root crops, fruits, cereals, tubers, pulses, ornamental plants, flowers, lawn grass, and trees.

The water-absorbent resin of the present invention may contain a fertilizer component and/or an agricultural chemical within a range not detracting from the advantageous effects of the present invention. Examples of fertilizers include three major fertilizers such as a nitrogen-based fertilizer, a phosphorus-based fertilizer, a potassium-based fertilizer and a calcium-based fertilizer; and fertilizers containing an essential element for plants such as calcium, magnesium, sulfur, iron, copper, manganese, zinc, boron, molybdenum, chlorine and nickel. Examples of agricultural chemicals include an insecticide, a microbicide, an insecticidal and microbicidal agent, a herbicide, a rat poison, and a plant growth regulator. One alone or plural kinds of these may be contained either singly or as combined.

The water-absorbent resin of the present invention has excellent water-absorbing characteristics and mechanical characteristics, and therefore can be applied to any other generally-known uses for water-absorbent resins in addition to agricultural water-retaining materials, for example, for absorbents in sanitary goods such as diapers for infants, diapers for babies, diapers for children, diapers for adults, sanitary goods, and protective undergarment; water-penetration inhibiting materials for underground power cables or communication cables, carriers in chemical transmission; absorbent materials for aqueous outflows and drainages; coating materials; inks; absorbent coatings for colorant compositions; carriers for controlled emission of insecticides, herbicides, aromas, and chemicals; flame-retardant gels; funeral pads; surgical pads; wound dressings; waste solidifying agents for medical use; absorbent pads and wrapping materials for foods; gelling agents for cosmetics; sealing composite materials; use for filtration; fuel monitoring systems for airplanes and automobiles; water feeders for caged animals; static water beds; toys to expand in water; additives to drilling fluids; and artificial snows.

EXAMPLES

Hereinunder the present invention is described more specifically with reference to Examples, but the present invention is not whatsoever restricted by these Examples.
(Starting Materials)
Glyoxylic acid monohydrate, 40 mass % glyoxal aqueous solution, 25 mass % glutaraldehyde aqueous solution, acetonitrile, methanol: all from Wako Pure Chemical Industries Corporation
Polyvinyl alcohol (a): from Kuraray Corporation, degree of saponification 99 mol %, viscosity-average degree of polymerization 1700
Acrylic acid structural unit-containing polyvinyl alcohol (b): from Kuraray Corporation, degree of saponification 99 mol %, viscosity-average degree of polymerization 1700, acrylic acid structural unit content 5 mol %
(Measurement Method)
(1) Carboxy Group Amount, Average Residual Hydroxy Group Amount
The resin produced in Examples and Comparative Examples was analyzed through solid $^{13}$C-NMR (model name ECZ-500R from JEOL Ltd., 500 MHz). In the resultant $^{13}$C-NMR spectra, from the peak corresponding to the carbonyl carbon (generally given at 160 to 180 ppm), the methine carbon with the hydroxy group of the vinyl alcohol unit bonding thereto (generally given at 60 to 80 ppm), the methyl carbon of the vinyl ester group of the vinyl acetate unit (generally given at 10 to 30 ppm), and the methylene carbon of the ethylene unit (generally given at 30 to 50 ppm), the molar number of the carboxy group, the molar number of the hydroxy group, the molar number of the vinyl acetate unit and the molar number of the ethylene unit in the resin were determined, and the carboxy group amount and the average residual hydroxy group amount were calculated according to the following equation.

Carboxy group amount [mol %]=[(molar number of carboxy group)/(molar number of all structural units)]×100

Average residual hydroxy group amount [mol %]= [(molar number of hydroxy group)/(molar number of all structural units)]×100

<Case where the resin is a saponified product of a copolymer of one or more selected from a carboxy group-having monomer and a derivative of the monomer, and a vinyl ester (Examples 7 and 8)>

Molar number of all structural units=(molar number of carboxy group)+(molar number of hydroxy group)+(molar number of vinyl acetate unit)+ (molar number of ethylene unit)

<Case where the resin is such that at least a part of the vinyl alcohol unit therein is acetalized with one or more selected from a carboxy group-having aldehyde and an derivative of the aldehyde (Examples 1 to 6)>

Molar number of all structural units=(molar number of carboxy group)×2+(molar number of hydroxy group)+(molar number of vinyl acetate unit)+(molar number of ethylene unit)

(2) Crystal Melting Enthalpy

The resin produced in Examples and Comparative Examples was dried in vacuum at 40° C. until it came to have a constant mass, and then heated from 0° C. up to 240° C. at a heating rate of 10° C./min for measurement using a differential scanning calorimeter (DSC25, from TA Instruments Corporation).

(3) Amount of Pure Water Absorption

The amount of pure water absorption by the resin produced in Examples and Comparative Examples was measured according to JIS K 7223, and amount of pure water absorption Xa (g/g) was calculated.

Xa (g/g)=[(mass of sample after pure water absorption)−(mass of sample before pure water absorption)]/(mass of sample before pure water absorption)

(4) Time Taken for Water Absorption (Vortex Method)

According to JIS K 7224, the time taken for water absorption by the resin produced in Examples and Comparative Examples was measured. A shorter time taken for water absorption, as measured according to the method, means a higher speed of water absorption.

(5) Time for Water Absorption (Measuring Cylinder Method)

One mL of the resin produced in Examples and Comparative Examples was put into a 10-mL measuring cylinder having an inner diameter of 10.8 mm, and from the top of the measuring cylinder, 9 mL of pure water was added thereto taking 10 seconds. After addition of the entire amount of pure water, the time until the top of the resin reached a scale of 10 mL was measured. A longer time taken for water absorption, as measured according to the method, means that particles fused together readily to form coarse aggregates.

Example 1

6.28 g of glyoxylic acid monohydrate, 0.0549 g of an aqueous solution of 40 mass % glyoxal, 16.5 g of ion-exchanged water, 150 mL of acetonitrile, and 20.0 g of the polyvinyl alcohol (a) were put into a 300-mL four-neck separable flask equipped with a reflux condenser tube and a stirring blade, and stirred for 1 hour at 23° C. to disperse the polyvinyl alcohol (a). 4.74 g of an aqueous solution of 47 mass % sulfuric acid was dropwise added thereto taking 30 minutes, heated up to 70° C., and reacted for 18 hours. After the reaction, the resin was taken out through filtration, and washed 5 times with 500 mL of acetonitrile. The resin was put into a 300-mL four-neck separable flask equipped with a reflux condenser tube and a stirring blade, and a mixed solution of 150 mL of methanol and 10 g of potassium hydroxide was added thereto and reacted at 50° C. for 12 hours. The resin was taken out through filtration, washed 5 times with 500 mL of methanol, and dried in vacuum at 40° C. for 6 hours to give an intended water-absorbent resin. The resultant water-absorbent resin was analyzed according to the above (1) to (5). The results are shown in Table 1.

Example 2

An intended water-absorbent resin was synthesized and analyzed in the same manner as in Example 1 except that the amount added of the aqueous solution of 40 mass % glyoxal was changed to 0.0392 g. The results are shown in Table 1.

Example 3

An intended water-absorbent resin was synthesized and analyzed in the same manner as in Example 1 except that the amount added of glyoxylic acid monohydrate and the aqueous solution of 40 mass % glyoxal was changed to 4.18 g and 0.0523 g, respectively. The results are shown in Table 1.

Example 4

An intended water-absorbent resin was synthesized and analyzed in the same manner as in Example 1 except that the amount added of glyoxylic acid monohydrate and the aqueous solution of 40 mass % glyoxal was changed to 12.55 g and 0.157 g, respectively. The results are shown in Table 1.

Example 5

An intended water-absorbent resin was synthesized and analyzed in the same manner as in Example 1 except that the amount added of glyoxylic acid monohydrate, the aqueous solution of 40 mass % glyoxal, ion-exchanged water and acetonitrile was changed to such that glyoxylic acid monohydrate was 13.39 g, the aqueous solution of 40 mass % glyoxal was 0.0784 g, ion-exchanged water was 75 g, and acetonitrile was 75 mL. The results are shown in Table 1.

Example 6

An intended water-absorbent resin was synthesized and analyzed in the same manner as in Example 1 except that the amount added of glyoxylic acid monohydrate and the aqueous solution of 40 mass % glyoxal was changed to 1.67 g and 0.0264 g, respectively. The results are shown in Table 1.

Example 7

180.0 g of ion-exchanged water and 20.74 g of the acrylic acid structural unit-containing polyvinyl alcohol (b) were put into a 500-mL four-neck separable flask equipped with a reflux condenser tube and a stirring blade, and heated up to 90° C. with stirring to dissolve the acrylic acid structural unit-containing polyvinyl alcohol (b). The system was cooled to 20° C., then a mixed solution of 4.74 g of an aqueous solution of 47 mass % sulfuric acid and 0.4053 g of an aqueous solution of 25 mass % glutaraldehyde was dropwise added thereto taking 5 minutes, and reacted for 1 hour. The system was heated up to 70° C., and further reacted for 4 hours. The contents of the flask were taken out, and the resin was washed with methanol. After no more release of sulfuric acid from the resin was confirmed through pH measurement, the resin was dried in vacuum at 40° C. The resin was ground and classified through a mesh having an opening of 100 to 250 μm. The resin was put into a 300-mL four-neck separable flask equipped with a reflux condenser tube and a stirring blade, then a mixed solution of 150 mL of methanol and 10 g of potassium hydroxide was added thereto, and reacted at 50° C. for 12 hours. The resin was taken out through filtration, washed 5 times with 500 mL of methanol, and dried in vacuum at 40° C. for 6 hours to give an intended water-absorbent resin. The resultant water-absorbent resin was analyzed according to the above (1) to (5). The results are shown in Table 1.

Example 8

0.4053 g of an aqueous solution of 25 mass % glutaraldehyde, 16.5 g of ion-exchanged water, 150 mL of acetonitrile and 20.74 g of the acrylic acid structural unit-containing polyvinyl alcohol (b) were put into a 300-mL four-neck separable flask equipped with a reflux condenser tube and a stirring blade, and stirred at 23° C. for 1 hour. 4.74 g of an aqueous solution of 47 mass % sulfuric acid was dropwise added thereto taking 30 minutes, heated up to 70° C. and reacted for 12 hours. After the reaction, the resin was taken out through filtration, and washed 5 times with 500 mL of acetonitrile. The resin was put into a 300-mL four-neck separable flask equipped with a reflux condenser tube and a stirring blade, then a mixed solution of 150 mL of methanol and 10 g of potassium hydroxide was added thereto, and reacted at 50° C. for 12 hours. The resin was taken out through filtration, washed 5 times with 500 mL of methanol, and dried in vacuum at 40° C. for 6 hours to give an intended water-absorbent resin. The resultant water-absorbent resin was analyzed according to the above (1) to (5). The results are shown in Table 1.

Comparative Example 1

150.0 g of ion-exchanged water, and 30.0 g of the polyvinyl alcohol (a) were put into a 500-mL four-neck separable flask equipped with a reflux condenser tube and a stirring blade, and heated up to 90° C. with stirring to dissolve the polyvinyl alcohol. While the system was kept at 90° C., a mixed solution of 11.3 g of glyoxylic acid monohydrate, 5.45 g of ion-exchanged water and 0.0549 g of an aqueous solution of 40 mass % glyoxal was dropwise added thereto taking 5 minutes, and reacted for 1 hour. The system was cooled to 70° C., and further reacted for 4 hours. The contents of the flask were taken out, and dried with a hot air drier (DKM400 by Yamato Scientific Co., Ltd.) at 105° C. for 30 minutes. The resultant resin was ground and dried at 105° C. for 9 hours. Of the resin, a part having passed through a mesh having an opening of 0.75 μm was screened, and dried at 105° C. for 7 hours. The resultant resin was immersed in 300 mL of an aqueous solution of 50 mass % potassium hydroxide at 23° C. for 16 hours, and then washed with ion-exchanged water to give an intended resin. The resultant water-absorbent resin was analyzed according to the above (1) to (5). The results are shown in Table 1.

Comparative Example 2

A resin was synthesized and analyzed in the same manner as in Comparative Example 1 except that the amount added of the aqueous solution of 40 mass % glyoxal was changed to 0.424 g. The results are shown in Table 1.

TABLE 1

| | Carboxy Group Amount [mol %] | Degree of Acetalization [mol %] | Cross-linking Agent Amount [mol %] | Crystal Melting Enthalpy [J/g] | Average Residual Hydroxy Group Amount [mol %] | Amount of Pure Water Absorption [g/g] | Time for Water Absorption | |
|---|---|---|---|---|---|---|---|---|
| | | | | | | | Vortex Method [s] | Measuring Cylinder Method [min] |
| Example 1 | 15 | 30 | 0.083 | 30.9 | 70 | 251 | 5.3 | 15 |
| Example 2 | 15 | 30 | 0.059 | 32.5 | 70 | 489 | 5.1 | 15 |
| Example 3 | 10 | 20 | 0.079 | 37.9 | 80 | 44 | 4.9 | 16 |
| Example 4 | 30 | 60 | 0.238 | 18.2 | 40 | 260 | 4.5 | 19 |
| Example 5 | 32 | 64 | 0.119 | 0.9 | 36 | 110 | 27 | 7 |
| Example 6 | 2 | 4 | 0.040 | 58.9 | 96 | 90 | 4.4 | 32 |
| Example 7 | 5 | 0 | 0.083 | 15.9 | 95 | 350 | 30 | 10 |
| Example 8 | 5 | 0 | 0.083 | 23.3 | 95 | 60 | 28 | 7 |
| Comparative Example 1 | 15 | 30 | 0.083 | 0 | 70 | 289 | 36 | 12 |
| Comparative Example 2 | 15 | 30 | 0.642 | 0 | 70 | 120 | 108 | 5 |

As known from Examples 1 to 8, the water-absorbent resins of Examples that contain a vinyl alcohol-based polymer and have a crystal melting enthalpy of more than 0 J/g in a dry state express an excellent speed of water absorption. On the other hand, the water-absorbent resins of Comparative Examples 1 and 2 having a crystal melting enthalpy of 0 are insufficient in point of speed of water absorption. In addition, as known from Examples 1 to 6, in which at least a part of the vinyl alcohol unit in the vinyl alcohol-based polymer has been acetalized with one or more selected from a carboxy group-having aldehyde and a derivative of the aldehyde, the water-absorbent resins express more excellent speed of water absorption. Further, from comparison between Example 6 and the other Examples, it is known that when the crystal melting enthalpy is 50 J/g or less, the time for water absorption (measuring cylinder method) is shorter and particles hardly fuse together in water absorption to form coarse aggregates.

The invention claimed is:

1. A water-absorbent resin comprising a vinyl alcohol-based polymer, wherein the water-absorbent resin has a crystal melting enthalpy of more than 0 J/g in a dry state, and wherein the water-absorbent resin has a crosslinked structure.

2. The water-absorbent resin of claim 1, wherein the vinyl alcohol-based polymer has a carboxy group.

3. The water-absorbent resin of claim 1, wherein at least a part of a vinyl alcohol unit of the vinyl alcohol-based polymer is acetalized with one or more selected from the group consisting of an aldehyde having a carboxy group and a derivative of an aldehyde having a carboxy group.

4. The water-absorbent resin of claim 3, wherein the aldehyde is a glyoxylic acid.

5. The water-absorbent resin of claim 2, wherein the carboxy group amount in the vinyl alcohol-based polymer is 0.05 mol % or more and 40 mol % or less relative to all the structural units in the vinyl alcohol-based resin.

6. The water-absorbent resin of claim 1, wherein an average residual hydroxy group amount in the vinyl alcohol-based polymer is more than 20 mol %.

7. The water-absorbent resin of claim 1, wherein the crystal melting enthalpy is 10 J/g or more and 50 J/g or less.

8. A method of increasing water use efficiency for a crop or a seed, comprising:
    applying the water-absorbent resin of claim 1 to the crop or the seed, applying the water-absorbent resin to soil comprising the crop or the seed, or a combination thereof.

9. An agricultural water-retaining material comprising the water-absorbent resin of claim 1 and
    a fertilizer component and/or an agricultural chemical.

* * * * *